US012148407B2

(12) United States Patent
Grant

(10) Patent No.: US 12,148,407 B2
(45) Date of Patent: Nov. 19, 2024

(54) COVER AND STRAP FOR A STRINGED MUSICAL INSTRUMENT

(71) Applicant: Adam Grant, West Hollywood, CA (US)

(72) Inventor: Adam Grant, West Hollywood, CA (US)

( * ) Notice: Subject to any disclaimer, the term of this patent is extended or adjusted under 35 U.S.C. 154(b) by 689 days.

(21) Appl. No.: 17/475,239

(22) Filed: Sep. 14, 2021

(65) Prior Publication Data

US 2022/0005444 A1 Jan. 6, 2022

Related U.S. Application Data

(63) Continuation-in-part of application No. 17/204,686, filed on Mar. 17, 2021, now Pat. No. 11,074,895.

(60) Provisional application No. 63/145,455, filed on Feb. 3, 2021.

(51) Int. Cl.
*G10G 5/00* (2006.01)
*G10D 1/08* (2006.01)
*G10D 3/00* (2020.01)

(52) U.S. Cl.
CPC ............... *G10G 5/005* (2013.01); *G10D 1/08* (2013.01); *G10D 3/00* (2013.01)

(58) Field of Classification Search
CPC ............. G10G 5/005; G10D 1/08; G10D 3/00
See application file for complete search history.

(56) References Cited

U.S. PATENT DOCUMENTS

| | | | | |
|---|---|---|---|---|
| 7,825,314 B2 * | 11/2010 | Pace | G10D 3/00 | 84/304 |
| 2005/0145095 A1 * | 7/2005 | Larry | G10G 7/00 | 84/453 |
| 2011/0197739 A1 * | 8/2011 | Pearce | G10D 3/00 | 84/453 |
| 2013/0312586 A1 * | 11/2013 | Brunnemer | G10D 3/00 | 84/453 |

* cited by examiner

*Primary Examiner* — Jianchun Qin
(74) *Attorney, Agent, or Firm* — Barry Choobin; Patent 360

(57) ABSTRACT

A utility article for protecting and covering the strings of a musical instrument, while providing options for visibility and display. The utility article, including a covering member made of flexible material and having a front side and a rear side. Four flaps extend from the left edge and the right edge of the covering member, wherein two flaps extend outwards to form a sleeve and the two flaps extend rearwards wrapping the neck of the musical instrument. The two pockets will serve for holding the user's common accessories and tools, while an attachable flap will allow the device to second as a guitar strap when not in its primary use.

20 Claims, 9 Drawing Sheets

COVER AND STRAP FOR A STRINGED MUSICAL INSTRUMENT

CROSS-REFERENCE TO RELATED APPLICATIONS

This application is a continuation-in-part of a U.S. patent application Ser. No. 17/204,686, filed on Mar. 17, 2021, which claims priority from a U.S. provisional patent application Ser. No. 63/145,455, filed on Feb. 3, 2021, both the applications are incorporated herein by reference in their entirety.

FIELD OF INVENTION

The present invention relates to a protective neck cover and a strap for a musical instrument, and more particularly, the present invention relates to a dual-purpose utility article for stringed musical instruments that can cover the strings for protection and also use as a strap to hang the stringed musical instrument across the shoulders.

BACKGROUND

Stringed musical instruments, such as a guitar, generally include an elongated neck and a continuous body. Multiple strings extend along the length of the stringed instrument from neck to body. It is desirable to cover the strings to protect against both physical and environmental damage.

Covers for musical instruments are known in the art including stringed musical instruments. Such covers can protect musical instruments from both physical and environmental damage, including but not limited to dust and rust. Also, such covers can have a handle to pick and carry the musical instrument. However, the known covers completely cover the musical instrument and are bulkier. A user may desire to only cover the parts of the musical instrument that are prone to damage and rust, such as the strings, and display the aesthetic body of the instrument.

Thus, a long-term desire is there for a utility article for stringed musical instruments that can selectively cover and protect the strings. Also, guitar straps are known to hang the guitar across shoulders during a performance. The guitar straps can be applied for performance only and then stored separately. Storing and carrying the guitar straps can be bothersome. Also, multiple accessories can significantly increase the overall cost of a musical instrument and its maintenance. Thus, a desire is always there for a multipurpose utility article.

Hereinafter the stringed musical instrument is interchangeably referred to as musical instrument, stringed instrument and includes guitars, electric guitars, acoustic guitars, mandolins, banjos, violins, violas, and cellos.

SUMMARY OF THE INVENTION

The following presents a simplified summary of one or more embodiments of the present invention in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

It is therefore a principal object of the present invention directed to a utility article for protecting strings of a musical instrument.

It is still another object of the present invention that the utility article selectively covers the strings.

It is a further object of the present invention that the utility article is made of a soft microfiber material that prevents any scratches on the musical instrument but protects from the elements, such as sunlight, dust buildup, and rust and the users can enjoy the protection of fresh strings.

It is yet another object of the present invention that the utility article can be used to store small objects and double as a guitar strap.

It is still a further object of the present invention that the utility article is compact and light in weight.

It is an additional object of the present invention that the utility article can be rolled for storage.

It is still an additional object of the present invention that the utility article is economic to manufacture.

It is yet another object of the present invention that the utility of it seconding as a guitar strap through use of an added-on connector flap included with the product.

It is yet an additional object of the present invention that the utility article can be used as a strap to hang the stringed musical instrument across the shoulders when not used as the cover.

In one aspect, disclosed is a utility article for protecting and covering a string portion of a musical instrument. It can fold to cover half the fretboard or the entire length of the strings, depending on the user's display preferences. The disclosed utility article including a covering member made of flexible material and has a front side and opposite rear side. The length of the covering member can be proportional to the length of the string portion of the musical instrument. The width of the covering member can be proportional to the width of the string portion or neck of the musical instrument. The covering member can have a left edge, a right edge, a top edge, and a bottom edge. The covering member can have a neck portion adapted to cover the string portion along the neck of the musical instrument and a body portion adapted to cover the string portion along the body of the musical instrument. The bottom surface of the covering member can be made of microfiber or similar soft material that may not scratch the surface of the musical instrument.

In one aspect, the disclosed utility article further includes a pair of flaps i.e., the first flap and the second flap. The first flap extends from the left edge and the second flap extends from the right edge of the covering member. The length of the first flap and the second flap can be proportional to the length of the neck portion of the covering member. The first flap is configured to couple with the second flap to form a sleeve.

In one aspect, the disclosed utility article further includes a second pair of flaps that extends rearward i.e., towards the rear side of the covering member. The second pair of flaps includes a third flap and a fourth flap that extends from the left edge and the right edge of the neck portion of the covering member respectively and can be configured to wrap around the neck of the musical instrument. The third flap and the fourth flap can couple using a fastener, such as a hook and loop fastener.

In one aspect, the first flap or the second flap are having one or more pockets for storing small objects.

In one aspect, the first flap or the second flap are having two pockets of which at least one pocket is having a zipper.

In one aspect, the body portion of the covering member can fold over the neck portion and retain by the first flap coupled with the second flap.

In one aspect, the covering member has a proximal end and a distal end along the length of the covering member. A first connector flap can be coupled to the proximal end of the covering member and a second connector flap can be coupled to the distal end of the covering member. The proximal end can be at the neck portion of the covering member. Each the first connector flap and the second connector flap can couple to two strap buttons of the guitar, the strap buttons are for attaching a guitar strap.

In one aspect, the first connector flap can be swively coupled to the proximal end of the covering member through a fastener.

In one aspect, each the first flap and the second flap can have a series of mating members arranged in a longitudinal row at regular space intervals. In one case, the mating members can be buttonholes that can attach to strap buttons in the guitar, the strap buttons in the guitar are for attaching a guitar strap.

These and other objects and advantages of the embodiments herein and the summary will become readily apparent from the following detailed description taken in conjunction with the accompanying drawings.

BRIEF DESCRIPTION OF THE DRAWINGS

The accompanying figures, which are incorporated herein, form part of the specification and illustrate embodiments of the present invention. Together with the description, the figures further explain the principles of the present invention and enable a person skilled in the relevant arts to make and use the invention.

DETAILED DESCRIPTION

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, the reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an", and "the" are intended to include the plural forms as well, unless the context clearly indicates otherwise. It will be further understood that the terms "comprise", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention since the scope of the invention will be best defined by the allowed claims of any resulting patent.

Figure 1:
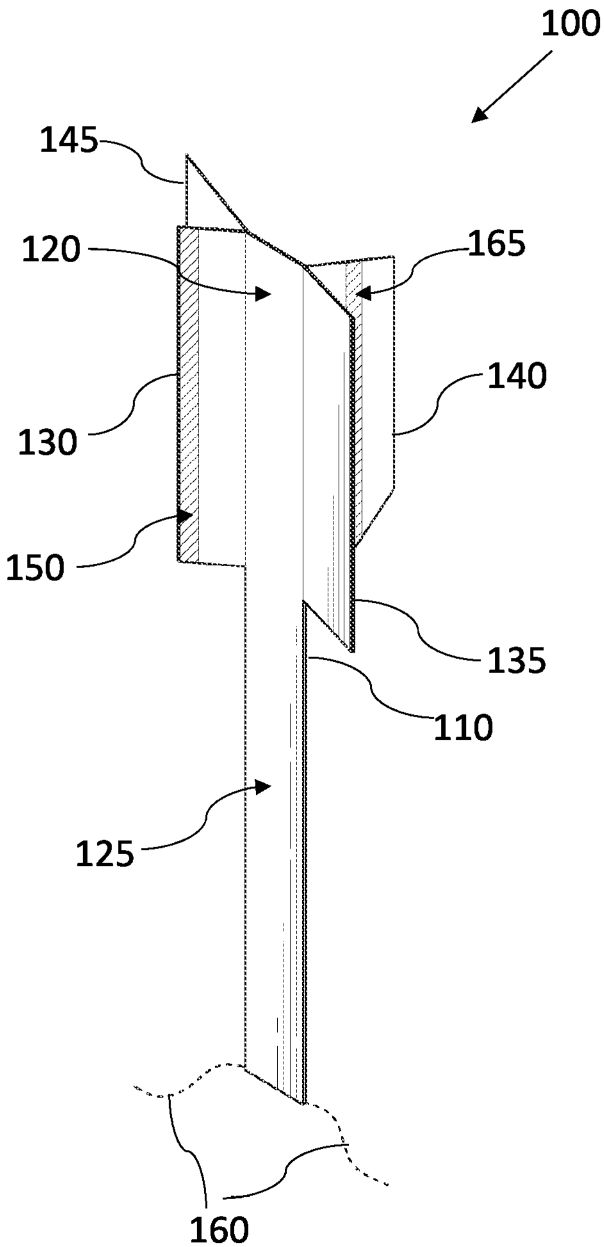
FIG. 1 is a perspective view of the utility article for covering the string portion of the musical instrument, according to an exemplary embodiment of the present invention.
Figure 2:
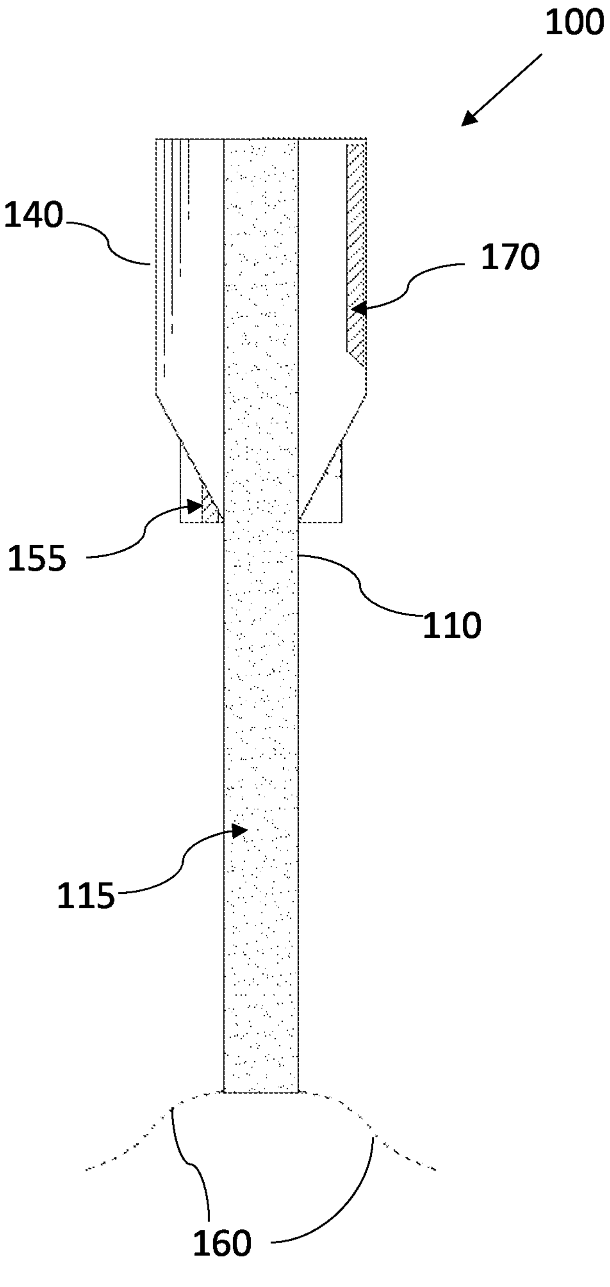
FIG. 2 shows the rear side of the utility article shown in FIG. 1 having a layer of microfiber material, according to the exemplary embodiment of the present invention.
Figure 3:
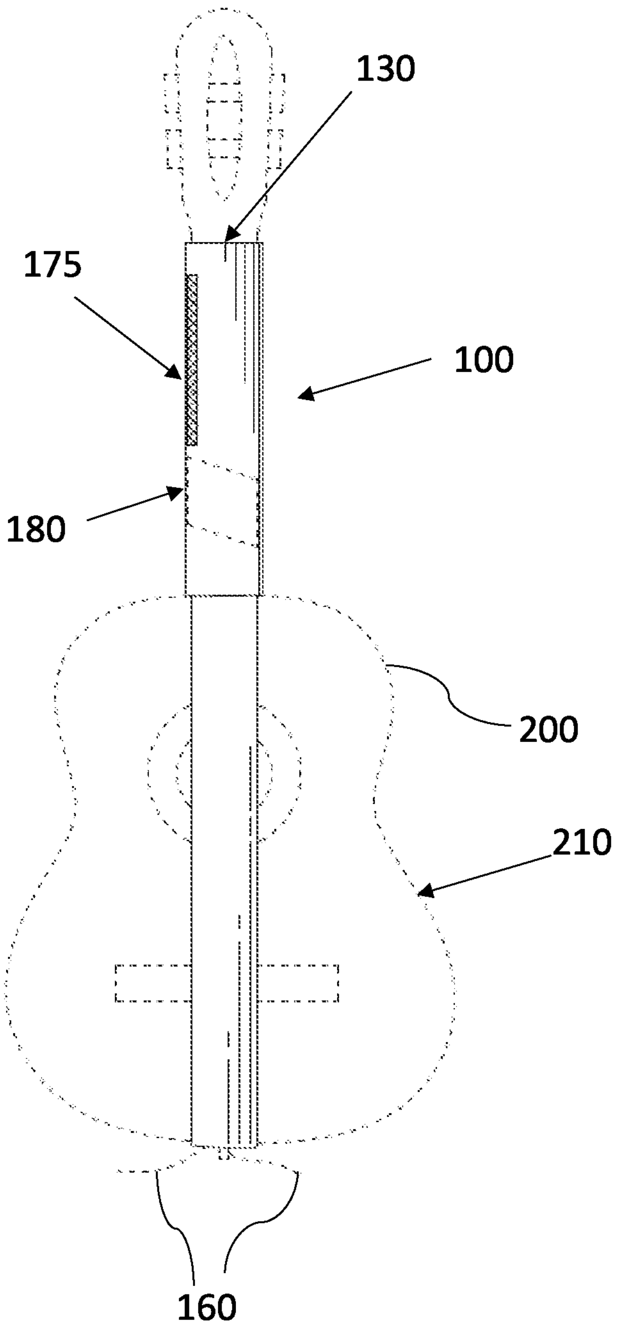
FIG. 3 shows the utility article installed on a guitar, according to the exemplary embodiment of the present invention.

Disclosed is a utility article for covering a string portion of a musical instrument. The stringed musical instrument has a neck and a body, wherein the strings extend from the neck to the body along the length of the musical instrument. Referring to FIG. 1 which shows an exemplary embodiment of the utility article 100. The disclosed utility article 100 has a covering member 110. The covering member can be made of flexible materials such as fabric, polyester, plastics, and like. The covering member has a front side and a rear side. The rear side 115 of the covering member 110 is shown in FIG. 2, wherein the stippling shows a microfiber cloth. The rear side of the covering member juxtaposes the strings and portions of the stringed instrument. In one case, the rear side of the covering member can have a layer of a soft material that may not scratch the surface of the musical instrument. The covering member can have a left edge, a right edge, a top edge, and a bottom edge. The left edge and the right edge are along the length of the covering member. The covering member can be assumed to be divided into two portions i.e., the neck portion 120 and the body portion 125. The neck portion covers the strings that are along the neck of the musical instrument while the body portion covers the strings that are the body of the musical instrument. FIG. 3 shows the guitar 200 having a neck (covered by the utility article) and a body 210.

The utility article 100 can have four flaps including a first flap 130, a second flap 135, a third flap 140, and a fourth flap 145. The length of the four flaps can be the same or less than the length of the neck portion 120 of the covering member 110 or the neck of the stringed instrument. The first flap and the second flap can form the first pair of flaps that extend upwards towards the front side of the covering member. The first flap extends from the left edge and the second flap extends from the right edge of the covering member. The first flap and the second flap can have a fastening member that allows the first flap to couple with the second flapforming a sleeve. The first flap and the second flap can fold over the front side of the covering member as shown in FIG. 3. Only the first flap 130 is visible which is overlapping the second flap 135. An additional, detachable flap (shown in FIG. 7) can be connected to the neck portion of the covering member 120, the detachable flap can be used to attach the utility article to the neck's guitar strap button. The first flap is having a first member 150 of the hook and loop fastener. The second member 155 of the hook and loop fastener can be provided on the second flap (shown in FIG. 2). The second member 155 of the hook and loop fastener is along the inner edge while the first member of the hook and loop fastener is on the outer edge.

Figure 4:
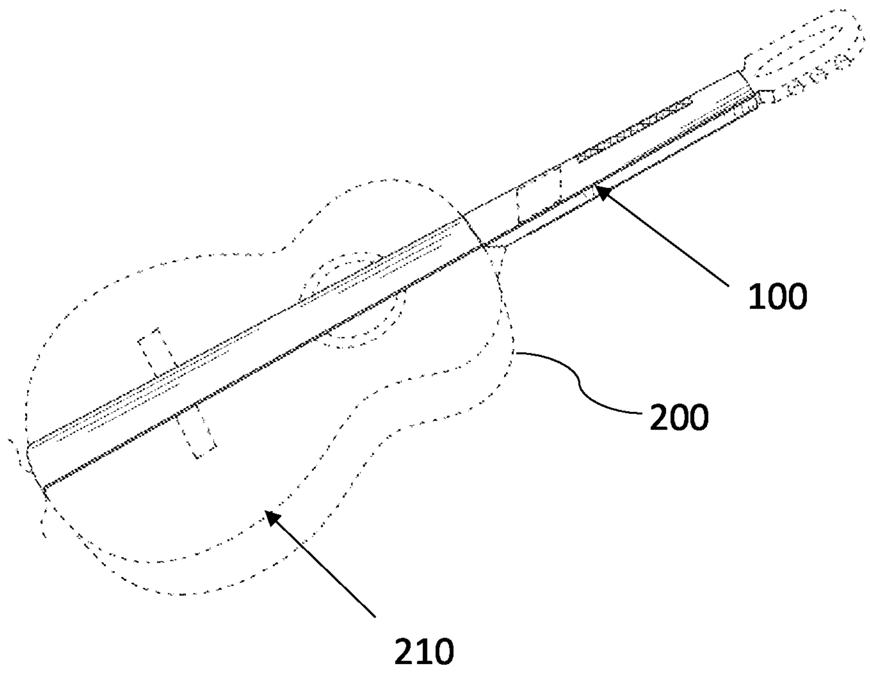
FIG. 4 shows a perspective view of the image shown in FIG. 3, according to the exemplary embodiment of the present invention.
Figure 5:
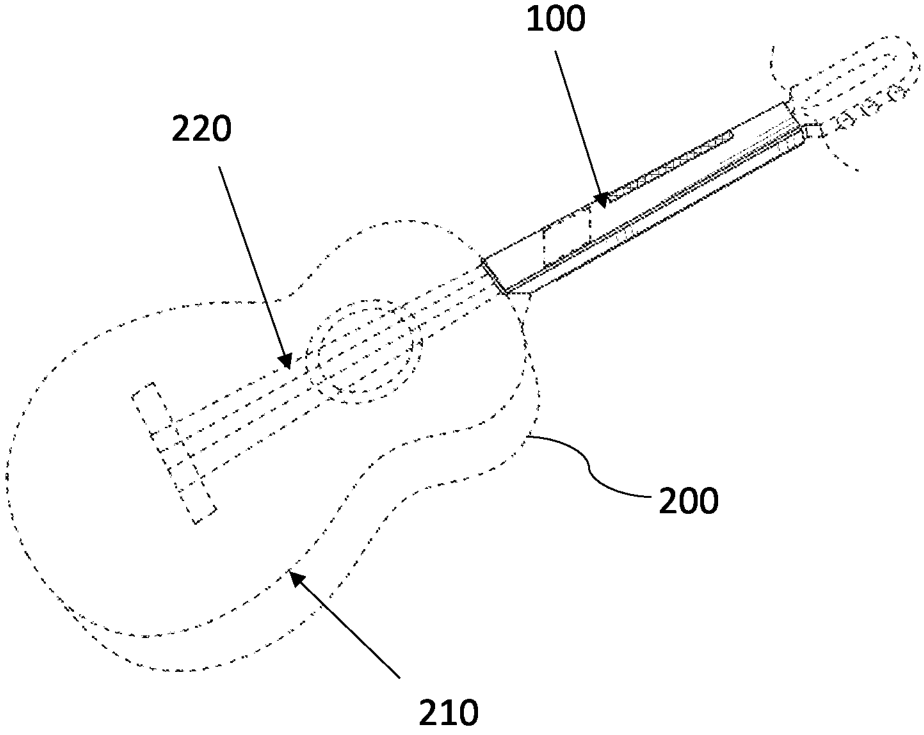
FIG. 5 shows the body portion of the covering member folded over its neck portion, according to the exemplary embodiment of the present invention.

The body portion of the covering member can fold over its neck portion. The body portion can be folded upwards to rest against the front side of the neck portion. Thereafter, the first flap can be coupled to the second flap to retain the body portion of the covering member folded over the neck portion. FIG. 4 shows the covering member 110 applied over the string portion of the guitar. The covering member can be seen extended from the start of the neck portion upwards to the bottom edge of the body of the guitar and thereafter folds inwards. The bottom edge of the covering member can have two cords 160 that can be fastened to the bottom of the guitar for securing the covering member to the guitar. This can also serve as the second attachment to the guitar for the body strap button. The first pair of flaps are shown folded in FIG. 3 and FIG. 4. FIG. 5 shows the body portion of the covering member folded over the neck portion and retained by the first pair of flaps.

Figure 6:
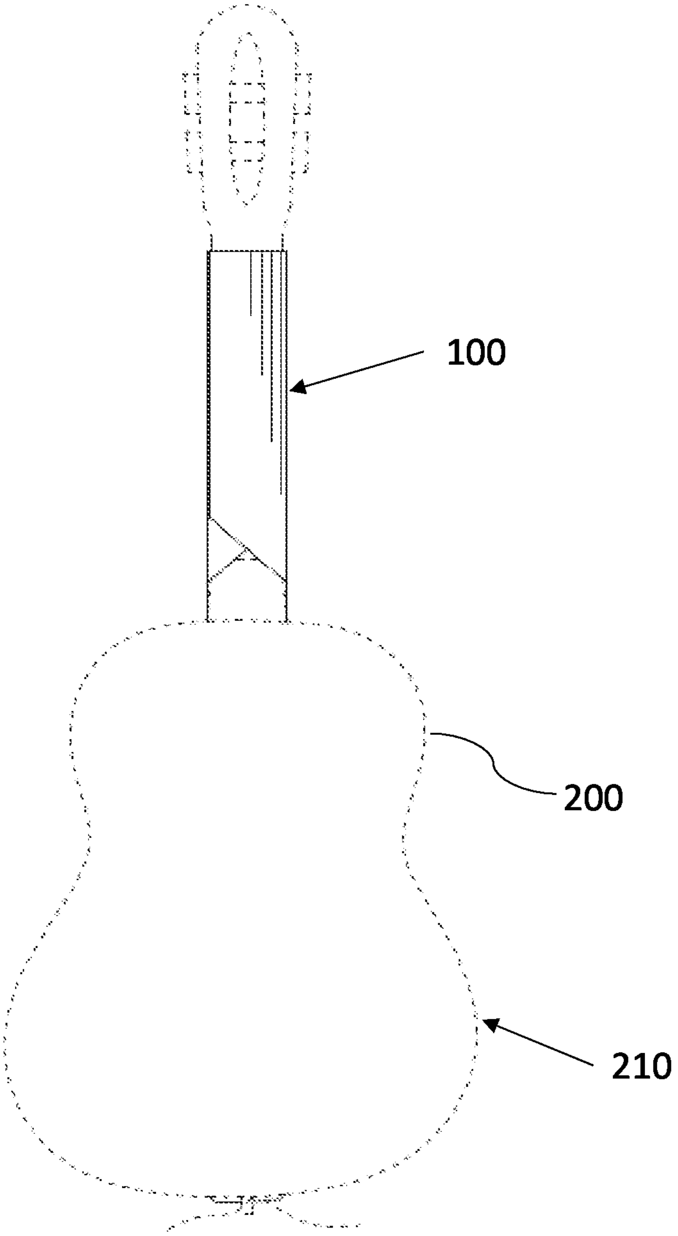
FIG. 6 is the rear side of the guitar shown in FIG. 4 having the flaps of the utility article wrapped over the neck of the guitar, according to the exemplary embodiment of the present invention.

Referring again to FIG. 1, the third flap 140 and the fourth flap 145 forms a second pair of flaps that can be wrapped around the neck of the guitar. The third flap and the fourth flap can fold over the neck of the guitar as shown in FIG. 6. The third flap extends from the right edge while the fourth flap extends from the left edge of the covering member. The third flap and the fourth flap extend rearwards and opposite to the first pair of flaps. The third flap and the fourth flap can also have suitable fasteners for coupling the third flap with the fourth flap. The fastener can be a hook and loop fastener. FIG. 1 shows the third flap 140 having the first part 165 of the hook and loop fastener while FIG. 2 shows the fourth flap 145 having the second part of the hook and loop fastener.

Referring to FIG. 3 can be seen a first pocket 175 and a second pocket 180. The pockets can be provided for storing small objects, such as guitar pick or plectrum and capo, which can be stored in the second pocket 180. FIG. 3 shows the pockets made in the first flap 130 that opens at the inner edge of the first flap. The first pocket 175 can have a closure such as a zipper.

Figure 7:
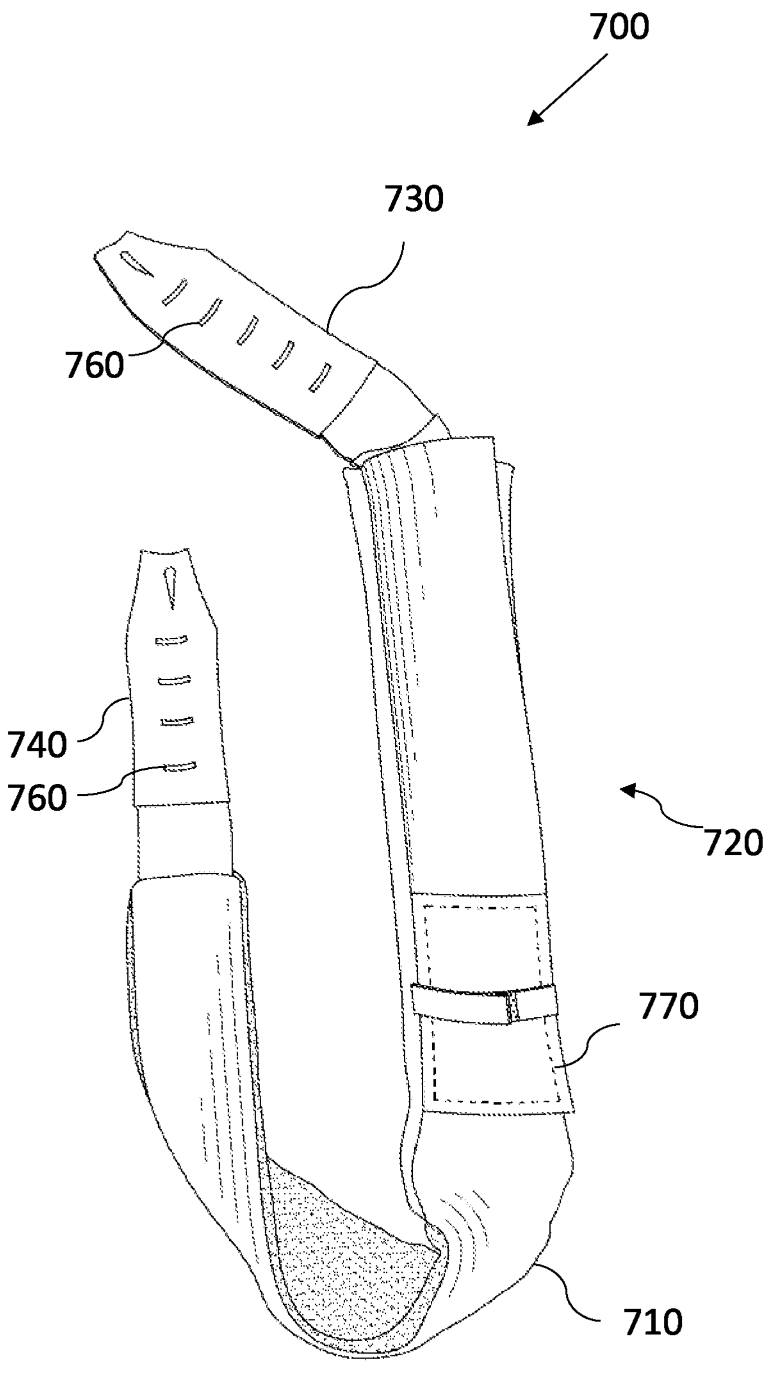
FIG. 7 shows another exemplary embodiment of the utility article that can be used as a cover and a strap, according to the exemplary embodiment of the present invention.

Referring to FIG. 7 which shows another exemplary embodiment of the disclosed utility article 700 that can also be used as a strap to hang the guitar across the shoulder. The utility articles can have a pair of connector flaps that can be applied to the strap buttons of the guitar. So, when the utility article is not being used to cover for stings, the utility article can be used as a strap to hang the guitar across the shoulders for performance. As shown in FIG. 7, the covering member 710 can include a proximal end and a distal end. The proximal end is along the neck portion of the covering member. The two pairs of flaps 720 are shown folded in FIG. 7, such as when the utility article is used as the guitar strap, the two pairs of flaps can be kept folded. The structure and working of the two pairs of flaps can be the same as described in FIG. 1 and not described here again. A first connector flap 730 can be provided at the proximal end of the covering member and a second connector flap 740 can be provided at the distal end of the covering member 710. Both the first connector flap and the second connector flap can fasten to two strap buttons of the guitar. Strap buttons are known for use in guitars to attach a guitar strap. The disclosed utility article can attach to such known strap buttons of the guitar. In one case, the first connector flap 730 can be removably coupled to the covering member 710. In one case, both the first connector flap 730 and the second connector flap 740 can be removably coupled to the covering member. It will be appreciated that referring to the guitar to illustrate an embodiment does not exclude other stringed musical instruments.

Figure 8:
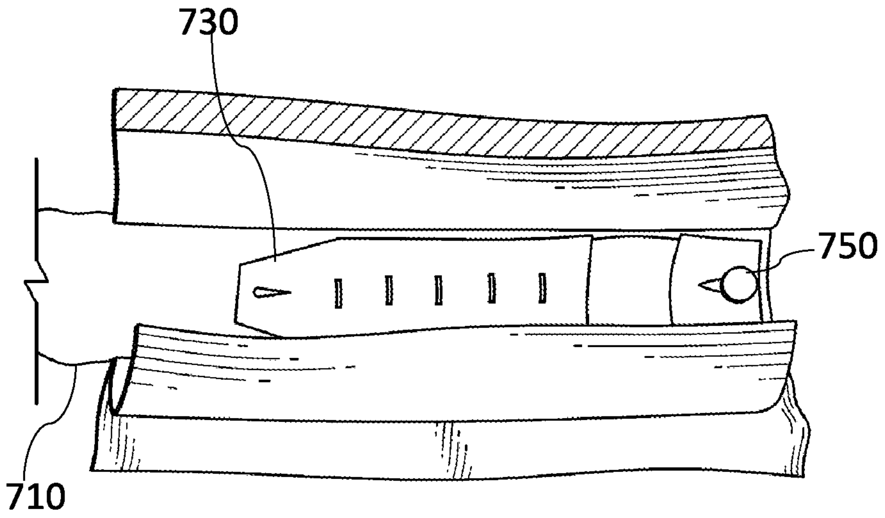
FIG. 8 is an enlarged view of the neck portion of the covering member showing a connector flap swively coupled to the covering member through a fastener, according to an exemplary embodiment of the present invention.

Referring to FIG. 8 which is an exploded view of the neck portion of the covering member 710. The flaps are shown uncovered to show the attachment of the first connector flap 730. The first connector flap 730 can be seen coupled to the proximal end of the covering member 710. A fastener 750 can be seen in the proximal end of the covering member 710 and the first connector flap 730 has a buttonhole, wherein the first connect flap 730 can be fastened to the covering member by inserting the fastener into the buttonhole. The first connector flap 730 can swivel relative to the fastener. In one case, the fastener can be a snap button. When the utility article 700 is used as a cover, the first connector flap 730 can be rotated inwards to lie against the covering member 710 and can be secured over the covering member by the first pair of flaps. When the utility article 700 is used as a strap, the first connector flap 730 can swivel outwards and be attached to the strap button. The second connector flap 740 can attach to the second strap button at bottom of the guitar. In use, the second connector flap 740 can replace the cords for securing the distal end of the covering member 710 to the guitar by attaching it to the strap button at bottom of the guitar. Thus, the second connector flap 740 can be functional both when the utility article 700 is used as a cover and as a strap.

Each the first connector flap 730 and the second connector flap 740 can have one or more mating members 760 that can couple to the strap buttons. The mating member 760 can be fasteners that can couple to the strap buttons of the guitar; thus, the choice of the mating members may depend on the strap buttons in the guitar. FIGS. 7 and 8 shows the mating member as buttonholes into which the strap buttons can be inserted and secured. Preferably, a series of mating members 760 can be provided that are spaced and arranged in a longitudinal row i.e., along the length of the connector flaps. Provision of multiple mating members can allow adjusting an effective length of the utility article 700 used as a strap. For example, coupling the utility article at two terminal mating members can result in the longest strap length, and coupling the utility article 700 at first mating members in the series can result in the shortest effective length of the strap.

Figure 9:
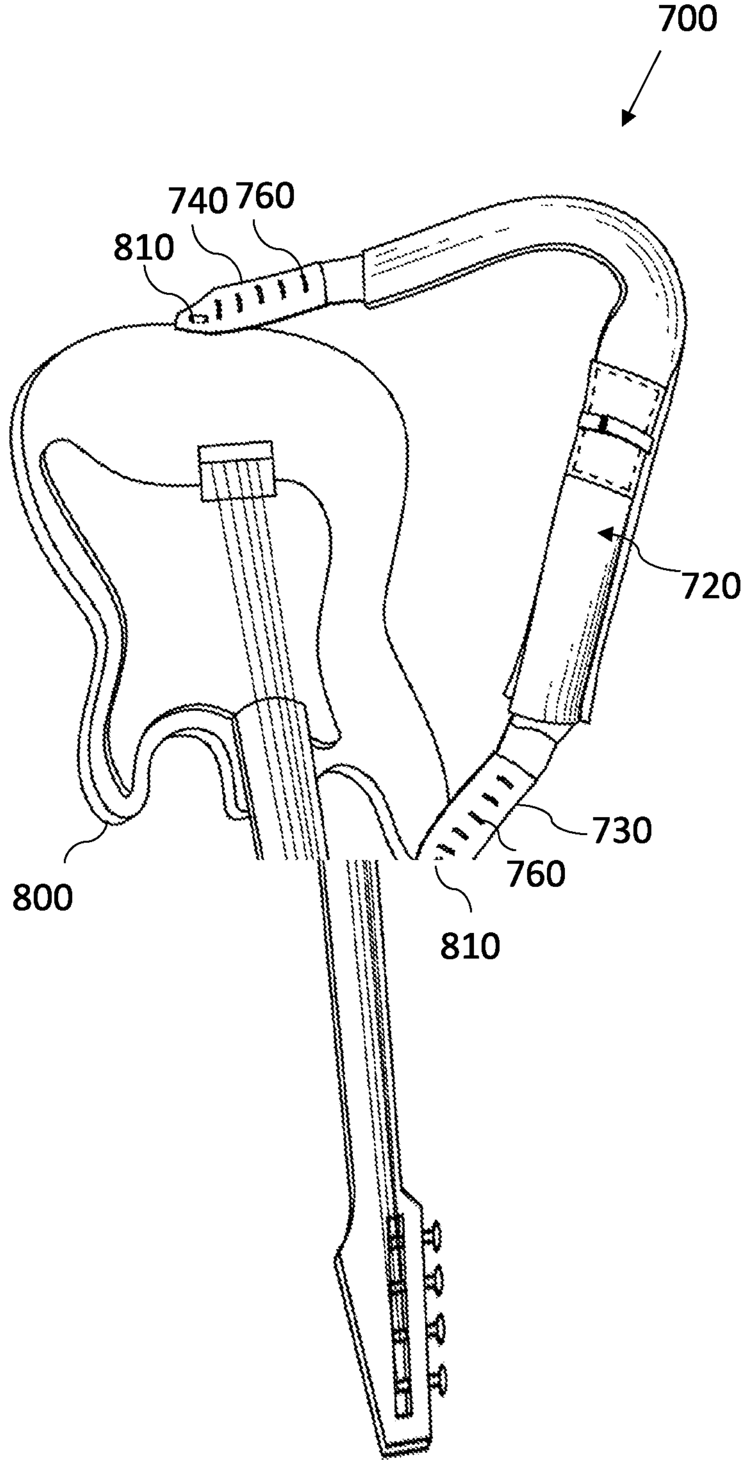
FIG. 9 shows the utility article as a strap secured to two strap buttons of the guitar, according to an exemplary embodiment of the present invention.

Referring to FIG. 9 which shows the utility article 700 used as a strap and secured to two strap buttons 810 of the guitar 800. The position of the strap buttons 810 in the guitar can be varied as desired by the user. The pocket 770 in the first flap is also visible.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A utility article for a stringed musical instrument, the stringed musical instrument comprises a body, a neck, and strings, the strings extend from the neck to the body, the utility article comprising:

a covering member made of a flexible material, the covering member is of a length proportional to a length of the strings, the covering member has a neck portion and a body portion, the neck portion configured to cover a string portion along the neck of the stringed musical instrument and the body portion of the covering member configured to cover a string portion along the body of the stringed musical instrument, the covering member has a proximal end and a distal end, the proximal end is at the neck portion of the covering member, the covering member has a front side and a rear side, a left edge, a right edge, a top edge, and a bottom edge;

a first flap and a second flap extend from the left edge and the right edge respectively of the neck portion outwards and towards the front side of the covering member, the first flap configured to couple with the second flap to form a sleeve;

a third flap and a fourth flap extend from the left edge and the right edge respectively of the neck portion of the covering member rearwardly and opposite to the first flap and the second flap, the third flap and the fourth flap adapted to wrap over the neck of the stringed musical instrument for securing the utility article to the stringed musical instrument;

a first connector flap coupled to the proximal end of the covering member, the first connector flap has one or more mating members, a first mating member of the one or more mating members of the first connector flap configured to couple to a first strap button of the stringed musical instrument; and a second connector flap coupled to the distal end of the covering member, the second connector flap has one or more mating members, a second mating member of the one or more mating members of the second connector flap configured to couple to a second strap button of the stringed musical instrument.

2. The utility article according to claim 1, wherein the rear side of the covering member has a layer of a microfiber cloth.

3. The utility article according to claim 1, wherein the stringed musical instrument is a guitar.

4. The utility article according to claim 1, wherein lengths of the first connector flap and the second connector flap are at least to permit the utility article to hang the stringed musical instrument across shoulders of a user, wherein the first connector flap is coupled to the first strap button and the second connector flap is coupled to the second strap button.

5. The utility article according to claim 1, wherein the first connector flap is swively coupled to the proximal end of the covering member through a fastener.

6. The utility article according to claim 1, wherein the one or more mating members of the first connector flap are buttonholes and the one or more mating members of the second strap button are buttonholes.

7. The utility article according to claim 1, wherein the one or more mating members of the first connector flap are two or more mating members arranged in a longitudinal row at spaced intervals, wherein the one or more mating members of the second connector flap are two or more mating members arranged in a longitudinal row at spaced intervals.

8. The utility article according to claim 1, wherein the second strap button is at a bottom of the stringed musical instrument, and the second connector flap is configured to secure the distal end of the covering member to the body of the stringed musical instrument when the third flap and the fourth flap are wrapped over the neck of the stringed musical instrument.

9. A utility article for a stringed musical instrument, the stringed musical instrument comprises a body, a neck, and strings, the strings extend from the neck to the body, the utility article comprising:

a covering member made of a flexible material, the covering member is of a length proportional to a length of the strings, the covering member has a neck portion and a body portion, the neck portion configured to cover a string portion along the neck of the stringed musical instrument and the body portion of the covering member configured to cover a string portion along the body of the stringed musical instrument, the covering member has a proximal end and a distal end, the proximal end is at the neck portion of the covering member, the covering member has a front side and a rear side, a left edge, a right edge, a top edge, and a bottom edge;

a third flap and a fourth flap extend from the left edge and the right edge respectively of the covering member rearwardly, the third flap and the fourth flap adapted to wrap over the neck of the stringed musical instrument for securing the utility article to the stringed musical instrument;

a first connector flap coupled to the proximal end of the covering member, the first connector flap has one or more mating members, a first mating member of the one or more mating members of the first connector flap configured to couple to a first strap button of the stringed musical instrument; and a second connector flap coupled to the distal end of the covering member, the second connector flap has one or more mating members, a second mating member of the one or more mating members of the second connector flap configured to couple to a second strap button of the stringed musical instrument.

10. The utility article according to claim 9, wherein the body portion of the covering member is configured to fold over the front side of the neck portion of the covering member, the utility article further comprises a retention member coupled to the covering member and configured to secure the body portion over the neck portion.

11. The utility article according to claim 9, wherein the stringed musical instrument is a guitar.

12. The utility article according to claim 9, wherein the first connector flap is swively coupled to the proximal end of the covering member through a fastener.

13. A method for protecting strings of a stringed musical instrument, the stringed musical instrument comprises a body, a neck, and strings, the strings extend from the neck to the body, the method comprising the steps of:

providing a utility article, the utility article comprising:

a covering member made of a flexible material, the covering member is of a length proportional to a length of the strings, the covering member has a neck portion and a body portion, the neck portion configured to cover a string portion along the neck of the stringed musical instrument and the body portion of the covering member configured to cover a string portion along the body of the stringed musical instrument, the covering member has a proximal end and a distal end, the proximal end is at the neck portion of the covering member, the covering member has a front side and a rear side, a left edge, a right edge, a top edge, and a bottom edge, a third flap and a fourth flap extend from the left edge and the right edge respectively of the covering member rearwardly, the third flap and the fourth flap adapted to wrap over the neck of the stringed musical instrument for securing the utility article to the stringed musical instrument, a first connector flap coupled to the proximal end of the covering member, the first connector flap has one or more mating members, a first mating member of the one or more mating members of the first connector flap configured to couple to a first strap button of the stringed musical instrument, and a second connector flap coupled to the distal end of the covering member, the second connector flap has one or more mating members, a second mating member of the one or more mating members of the second connector flap configured to couple to a second strap button of the stringed musical instrument;

fastening the third flap and the fourth flap around the neck of the stringed musical instrument;

upon fastening, unfastening the third flap and the fourth flap from the neck of the stringed musical instrument;

upon unfastening, coupling the third flap to the fourth flap;

upon unfastening, fastening the first connector flap to the first strap button; and fastening the second connector flap to the second strap button.

14. The method according to claim 13, wherein the second connector flap is fastened to the second strap button upon fastening the third flap and the fourth flap, wherein the second strap button is at a bottom of the stringed musical instrument.

15. The method according to claim 13, wherein the second connector flap is fastened to the second strap button upon fastening the first connector flap to the first strap button.

16. The method according to claim 13, wherein the first connector flap is swively coupled to the proximal end of the covering member through a fastener.

17. The method according to claim 16, wherein the utility article further comprises a retaining member coupled to the covering member, wherein the method further comprises the steps of:

rotating the first connector flap over the front side of the covering member; and securing the first connector flap over the front side of the covering member by the retaining member.

18. The method according to claim 17, wherein the method further comprises the steps of:

folding the body portion and the second connector flap over the front side of the neck portion of the covering member, wherein the retaining member secures the first connector flap, the second connector flap, and the body portion of the covering member to the front side of the neck portion of the covering member.

19. The method according to claim 13, wherein the method further comprises the steps of:

putting the covering member across shoulders of a user for hanging the stringed musical instrument.

20. The method according to claim 13, wherein the stringed musical instrument is a guitar.

* * * * *